Feb. 27, 1962     B. L. CORSON ET AL     3,022,988
MATERIAL TREATING DEVICE
Filed July 22, 1958     3 Sheets-Sheet 1
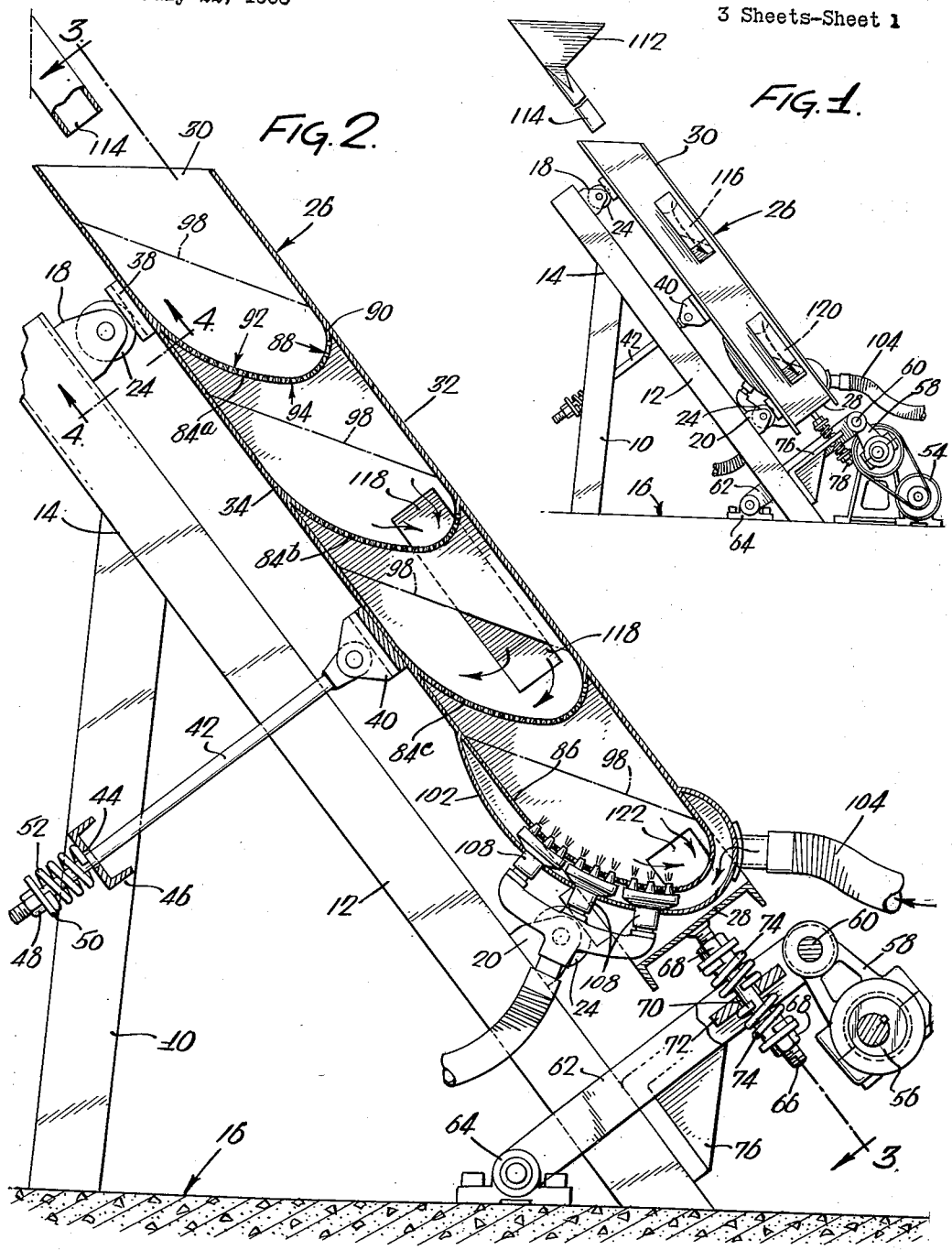
Inventors:
Bolton L. Corson
Clifton A. Danforth
by Howson & Howson Attys Feb. 27, 1962     B. L. CORSON ETAL     3,022,988
MATERIAL TREATING DEVICE
Filed July 22, 1958     3 Sheets-Sheet 2
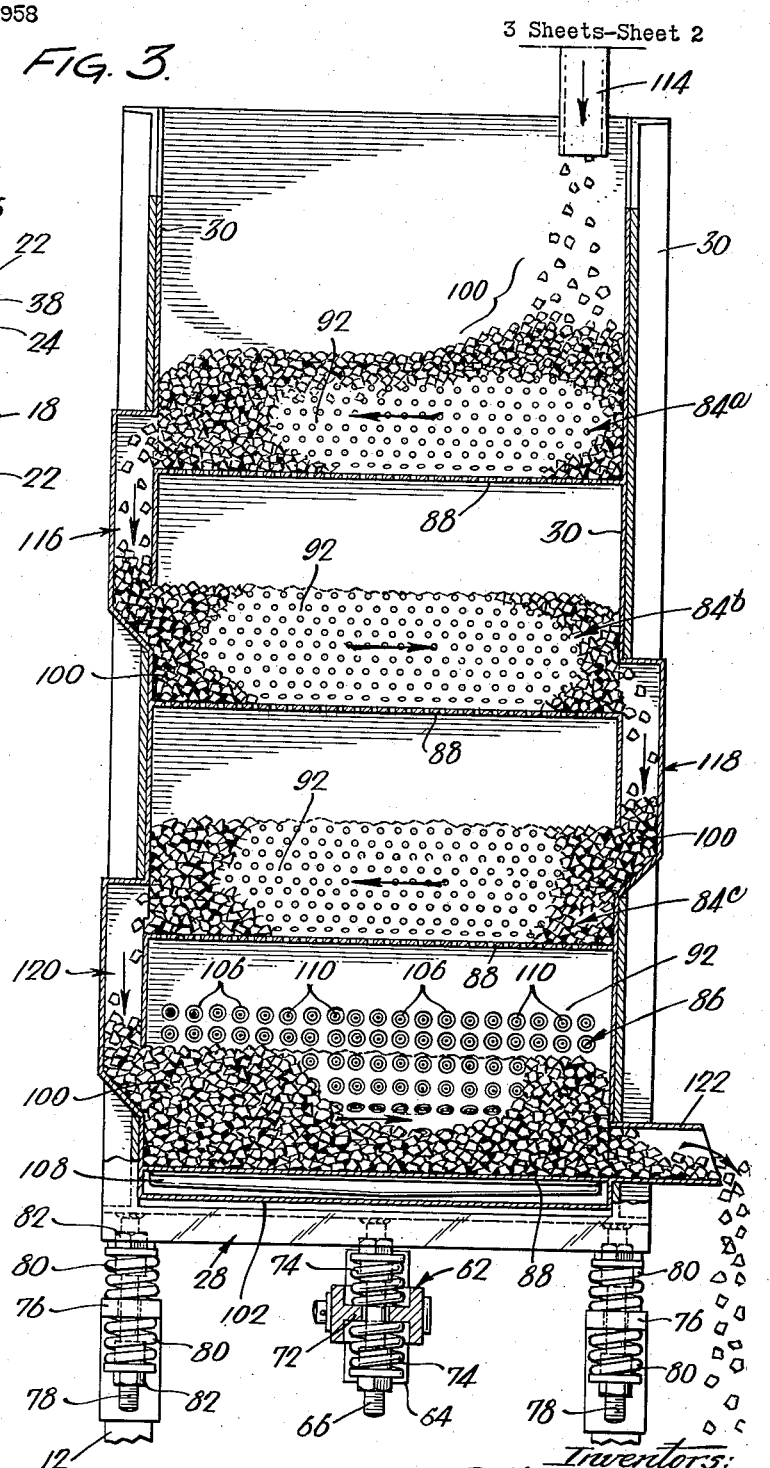
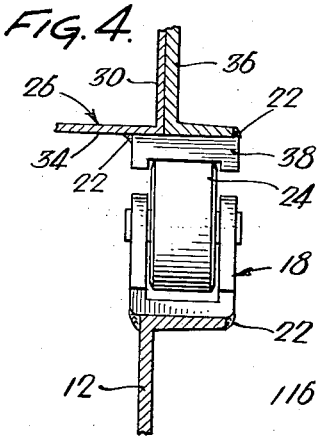
Inventors:
Bolton L. Corson
Clifton A. Danforth
by Howson & Howson Attys.

Feb. 27, 1962  B. L. CORSON ETAL  3,022,988
MATERIAL TREATING DEVICE
Filed July 22, 1958  3 Sheets-Sheet 3
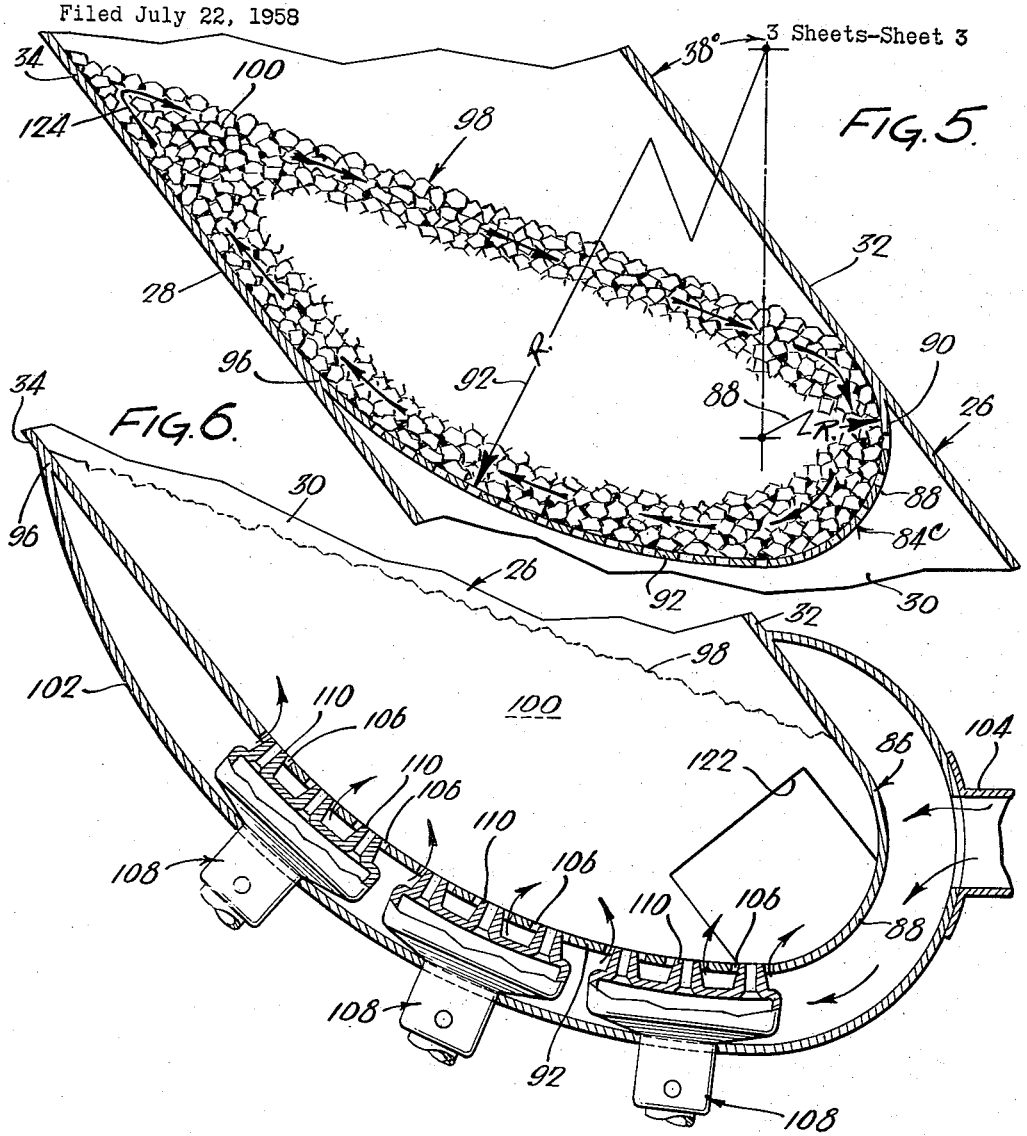
Inventors:
Bolton L. Corson
Clifton A. Danforth
by Howson & Howson
Attys.

United States Patent Office 3,022,988
Patented Feb. 27, 1962

3,022,988
MATERIAL TREATING DEVICE
Bolton L. Corson, Plymouth Meeting, and Clifton A. Danforth, Philadelphia, Pa., assignors to G. & W. H. Corson, Inc., Plymouth Meeting, Pa., a corporation of Delaware
Filed July 22, 1958, Ser. No. 750,117
6 Claims. (Cl. 263—21)

The present invention relates broadly to mechanism for treating materials, and more specifically to a device adapted for treating materials in the nature of a liquid or gas-solid reactor.

More specifically, the present device is adapted for heat treatment of materials, particularly of a discrete or particulate nature, and in such a manner that uniformity of heat treatment of the particles is provided with a high degree of efficiency, and with rapidity.

A still further object of the present invention is to provide a device for heat treatment of particulate material, such as limestone, such treatment being effected in an entirely new and different manner, overcoming known deficiencies and drawbacks in heretofore used rotary and vertical shaft kilns while at the same time obtaining the beneficial advantages of both types of kilns.

The present device is equally applicable for use as a dryer for materials as will be understood from the following specification.

The present apparatus is particularly useful as a calcining kiln for limestone, and the hereinafter described embodiment of the device will be particularly directed to a device for calcining or burning limestone. This is merely for illustrative purposes however, and manifestly the device can be used for many other operations and processes.

Present prevalent methods of burning or calcining limestone involve the use of either shaft kilns or rotary kilns. Each of these types of kilns, however, have serious disadvantages and drawbacks, even though substantially universally utilized for their purpose in the trade.

With respect to vertical shaft kilns it has been found that even distribution of heat is difficult to obtain, since heat by characteristic will follow heat, and channeling often occurs with a resultant uneven heat through the body of the material. This uneven heat results in non-uniformity of burning of the limestone often resulting in over burning and/or under burning of individual particles of the material being treated. Such vertical shaft kilns do, however, have a favorable fuel ratio to volume of material treated, which is a desirable characteristic.

As regards rotary kilns currently in use, one of the drawbacks is the high initial investment required for the device. Rotary kilns also have a very poor fuel ratio to volume of material treated due to the fact that heat transfer is mostly due to radiation from flame and hot gases. Additionally, when using rotary kilns, it has been found that there is a high degree of attrition due to a grinding action of the particles between themselves as the kiln rotates. This creates a substantial loss of material and problems of dust removal.

It is the primary object of the present invention to provide a device, particularly adapted for use as a lime kiln, which will produce lime of very high quality, while overcoming the disadvantages of rotary and shaft kilns.

A further object of the present invention is to provide a kiln or the like having a good fuel ratio, resulting in low cost of operation.

Another object of the present invention is to provide a kiln for limestone in which there is greatly reduced erosion, with a consequent improvement in yield and great reduction of dust problems.

An additional object of the present invention is to provide a highly effective kiln for burning limestone in which the initial cost of the equipment is substantially less than in other types of kilns.

A still further object of the present invention is to provide a lime kiln having a high efficiency of operation in small units, as distinguished from existing types of vertical shaft and rotary kilns.

A still further object of the present invention is to provide a device of this nature which can, if desired, eliminate the use of refractory materials and thereby decrease maintenance costs for the apparatus.

A further object of the present invention is to provide a device susceptible of construction in very small units with a consequent low weight, and which at the same time has a high production rate of treated material of high quality.

Another object of the present invention is to provide a device which can be operated wholly automatic, and which will substantially reduce labor costs.

An additional object of the present invention is to provide a lime kiln or the like having a short time period of treatment of the material, and which provides a thorough mixing of the individual particles due to the construction and type of operation, which decrease in time of motion and movement of stones with respect to one another prevents abrading and attrition of the materials.

Other and additional objects and advantages of the invention will be more readily apparent from the following detailed description of an embodiment thereof when taken together with the accompanying drawings in which:

FIG. 1 is a side elevational view of the apparatus of the present invention;

FIG. 2 is an enlarged sectional view taken substantially on the longitudinal center line of the apparatus;

FIG. 3 is a sectional view taken on line 3—3 of FIG. 2;

FIG. 4 is an enlarged fragmentary view of a detail taken on line 4—4 of FIG. 2;

FIG. 5 is an enlarged fragmentary sectional view through one of the upper material supports; and FIG. 6 is a view similar to FIG. 5 through the lowermost material support showing means for introduction of reactant material into the material.

Referring now to the drawings which depict an apparatus particularly suitable for burning or calcining limestone in pieces of fairly substantial size, which is illustrative of one type of treatment which can be effected in the present apparatus but obviously not confined thereto, a supporting frame includes substantially vertical legs 10 and inclined legs 12, interconnected with one another such as at 14, and firmly secured or mounted on a base 16 which can be of concrete, ground or the like. Upper and lower roller blocks 18 and 20 respectively, are mounted on the inclined legs 12 and secured thereto such as by welding at 22. Each of these roller blocks rotatably journal guide rollers 24. A casing or housing 26 consists of a bottom wall 28, side walls 30, front wall 32 and rear wall 34. The top of the casing can be open or partially closed, as desired. Angle irons 36 are secured to each side wall 30, having the lower flange thereof aligned with the exterior of rear wall 34. A guide channel member 38 is secured to the rear wall 34 and angle 36 at each side of the housing 26, as shown in detail in FIG. 4. This guide channel 38 coacts with the guide rolls 24 for movably supporting the housing 26 on the spaced inclined legs 12.

A bracket 40 is secured in any desired manner to the rear wall 34 intermediate the opposite ends of the housing as shown in FIG. 2. An arm 42 is pivotally secured to bracket 40, and the free end of the arm extends through an opening 44 in channel member 46 fixed between vertical legs 10. A nut 48 is engaged on the threaded end of arm 42 which, by coaction with plate 50, mounts a helical spring 52 therebetween and the channel 46. This arm serves the purpose of confinng the casing 26 in proper alignment for rolling motion in an up and down direction along the inclined legs 12 through coaction of guide rollers 24 and guide channels 38.

This or other means may be used to prevent the kiln from deviating from a prescribed path when vibrating.

Drive means for reciprocating or vibrating the casing 26 in an up and down motion along the legs 12 include a drive motor operatively connected to an eccentric drive means 56 and having an eccentric arm 58 pivotally connected at 60 to arm 62 pivotally mounted on bracket 64. A pin 66 is connected at one end to bottom wall 28 of the casing, and carries nuts 68 in screw-threaded engagement. The pin 66 passes through an opening 70 in an off-set plate 72 secured on arm 62. Helical springs 74 are mounted on either side of plate 72 around the pin 66 and the tension thereof can be adjusted by means of the nuts 68 in an obvious manner. As will be readily understood, when the drive motor 54 is actuated at desired time intervals the eccentric drive means will act to vibrate or reciprocate the casing up and down along the inclined legs 12. It is desirable that the drive means be so coordinated and operable as to vibrate or reciprocate the casing at the natural frequency of vibration of the drive springs 74 in a known manner, which substantially reduces the input power requirements for such movement.

An angle plate 76 is secured to each of the inclined legs 12. Pins 78 are secured at their upper ends to the bottom of the casing, in spaced relation on either side of the intermediate drive pin 66. These pins pass through openings in the angle plates 76 and have helical springs 80 on either side of the angle plate 76, as shown in FIG. 3 of the drawings. Nuts 82 permit adjusting the tension of these springs. The springs 80, in conjunction with the remainder of this structure, comprise support springs for the casing 26 and the springs 74 and the drive means 56 act so as to vibrate or reciprocate the casing at the natural frequency of vibration of the springs.

Material supports are provided in the interior of the casing 26 and, as shown in FIGS. 2 and 3, these supports consist of upper supports 84a, 84b and 84c. While three such supports are shown manifestly any number can be utilized. These material supports are in the nature of pretreating areas or supports for the material such as preheating or to elevate the material to a desired temperature for further treatment such as burning of limestone. A further material support 86 is disposed in proximity to the bottom of the casing and constitutes the primary material treatment area or support zone. The supports 84a, 84b and 84c are perforated substantially throughout their extent and extend transversely over the width of the interior of the casing as shown in FIG. 3. The support 86 likewise extends transversely of the width of the interior of the casing. Each of these supports has the same configuration and include a lower trough portion 88 of cylindrical or curvilinear configuration with the front edge thereof 90 merging tangentially into the front wall 32 of the casing. An upwardly inclined or extending portion 92 merges into the rear edge of trough portion 88 at 94, tangential with the surface thereof. This upwardly inclined extension 92 is likewise curvilinear or cylindrical in configuration, but with a substantially greater radius than the trough portion 88. In the particular embodiment shown in the drawings, the radius of the portion 92 is approximately six times greater than the radius of the portion 88. This has been found to be a highly efficient configuration to obtain a cycling or random mixing of the particles of the material as will be explained hereinafter. The upper edge of portion 92 merges into, and is tangential to the rear wall 34 of the casing at the area 96.

It will be noted that the casing 26 and the support legs 12 are disposed at a certain angle of inclination to the horizontal or plane of the base 16. In the particular embodiment shown in the drawings, this angle of inclination is approximately 38° from the vertical. This particular angle of inclination, in conjunction with the configuration and arrangement of the material supports 84 and 86, results, following vibration of the support, in an angle of repose, indicated in broken lines at 98, for a bed of particulate material 100 in the various material supports. This angle of repose in conjunction with the configuration and various angular dispositions of the individual members plays an important part in the treatment of material to provide substantially uniform treatment of each particle in the bed.

A jacket 102 is provided around the lower material support 86 into which opens an air supply duct 104. A plurality of spaced openings 106 are provided in the portion 92 of support 86 and a plurality of gas nozzles 108 each have a plurality of gas jets 110 thereon extending through the openings 106 as shown in FIG. 6 of the drawings. These gas jets 110 have smaller dimensions than the openings 106, and are disposed substantially concentrically in and with respect to the openings 106. Additionally, the inner ends of the gas jets 110 are substantially in the plane of the interior surface of portion 92 of the material support 86. This arrangement permits the introduction of air from conduit 104 into jacket 102, and thence around each of the gas jets 110 into the interior of the material support member 86. In operation, when calcining or burning limestone for example, it has been found that this particular arrangement of introduction of the gas and air prevents the burning or pitting of the material forming the material support, and additionally insures that the gas and air are introduced into the bed of material, and the burning therefore takes place directly in the bed of the material by means of combustion caused by contact of the hot surface of the limestone being treated with the gas-air mixture.

This construction of the gas and air inlet openings aids in eliminating the necessity of utilizing refractory material along the inner wall of the material support 86 in the region of the openings since the burning takes place within the bed of material, and the flow of air through the openings cools the material support and the heat absorbed by the air is utilized when ignition occurs in the mass of material being treated. It has been found that in accordance with the invention, metal such as steel plate can be utilized for the burning of lime whereas previously known apparatus has required the use of refractory material, in view of the high temperatures involved. The flow of air in conjunction with the spacing between the jets and the edges of the openings 106 also precludes fines from dropping into the jacket 102, and which otherwise might present a removal problem. The flow of gas precludes fines from entering the interior of the nozzles.

A limestone feed device 112 operatively associated with a source of supply of limestone is disposed above the casing 26 and discharges the material through spout 114 into the support 84a at one side thereof. A material passageway 116 interconnects the bottom of the side of material support 84a opposite from the inlet end where the material is introduced, with the upper end of one side of material support 84b. In like manner a material passageway 118 interconnects the opposite bottom end of support 84b with the top of one end of support 84c, and at the other end thereof, passageway 120 interconnects the bottom of the support with a top end of lower support 86. A discharge spout 122 is provided in the bottom of material support 86 to discharge treated material from the apparatus. This arrangement of material passageways, in conjunction with the inlet spout 114 and discharge spout 122, permits the passage of material to be treated from one support to the next succeeding lower support in a continuous cycle upon vibrating or reciprocating the apparatus as contemplated by the invention. Since this particulate material, under vibration or shaking, tends to level out or find its own level, it will move the material from the inlet end of a support to the outlet end thereof, and through the various passageways to the next succeeding lower support where the same action occurs. The movement of material through the apparatus is directed by arrows in FIG. 3 of the drawings from inlet to discharge therefrom.

Referring now to FIGS. 5 and 6 of the drawings, the cycling or movement of material on the various supports will be explained. When material has been introduced into the support it will tend, upon rapid vibration, reciprocation or shaking, to seek its own level. The plane of vibration will determine an angle of repose for the top surface of the bed of material as indicated at 98. The material in the lower support 86 is subjected to burning with the air-gas mixture burning on the hot surface of the limestones. The heat from this burning passes upwardly through each of the other material supports due to the perforations in these supports. When the drive means 56 are actuated intermittently the entire casing is rapidly vibrated or reciprocated in the plane of the supports. When this occurs the mass of particles on the plate is raised upwardly off the plate thence falling back by gravity onto the plate in a slightly more elevated position. As this action occurs, particles which are in the trough region 88 and in proximity to the supporting surface will move upwardly along the inclined upwardly extending surface or portion of the support as indicated by the arrows in FIG. 5. This action will continue and the particles will move upwardly along the plate until near the upper end of the bed where, as indicated by arrow 124, their movement will be reversed in the nature of a sluffing off action since, when the support is being vibrated or reciprocated rapidly, the angle of repose is disturbed and particles raised thereabove at the top of the mass. This will cause the particles at the top of the bed, in the uppermost layer or two, to roll down along the upper surface of the bed into the trough portion or region 88 where they transmit the upward motion of the trough to the bed of the particles on the support as also indicated by the arrows in FIG. 5.

The particles are imparted a lifting or jumping motion as a mass. The particles in this action will flow ultimately through a complete circuit and are rearranged or mixed caused at least in part by the sluffing action at the top of the bed. This action in conjunction with the steady discharge from one support to the next succeeding support insures that each of the particles is subjected to a uniform treatment as it passes through the various stages and with principal reference to the burning stage in the lower support.

Additionally, due to the fact that the entire mass of the bed is lifted or moves upwardly at the same time, a rolling of the stones with respect to one another, to the extent which exists in a rotary kiln, is avoided and this greatly reduces abrading and attrition which has been a problem in rotary kilns. It has been found that the time of treatment in the present device is very materially reduced with respect to the time necessary for treatment in a rotary kiln. As a matter of fact the time of treatment in the present device is only a fraction of that required in a rotary kiln. This factor together with reduction of rolling movement of the particles with respect to one another likewise materially reduces abrading or attrition.

One of the principal advantages of this device as compared with a rotary kiln is that the combustion of the fuel in the present device takes place in the mass of particles resulting in very efficient heat transfer, whereas in a rotary kiln the combustion takes place outside of the bed and the heat of combustion must be transferred to the material primarily by radiation from the flame and walls.

While in a shaft kiln combustion takes place in the mass of material, the distribution of the gas and air is so uneven conditions are extremely non-uniform through the mass and this results in some of the particles being exposed to extremely high heat and others are exposed to insufficient heat.

As pointed out hereinbefore, the direction of motion is in the line of the plane of the supports of legs 12. It has been found that only a small amplitude of stroke is adequate to effect the desired movement and cyling of the material as above described. In one operable unit having an output of over thirty tons of lime per day a ½ inch amplitude is satisfactory. The distance of movement, of course, can be varied within certain limits as desired. It is the intermittent action which governs the time of through put of the material.

It has been found that good results are obtained when the inclined surface 92 and the angle of movement are such that, when vibrating takes place, material in the bottom of the bed climbs up the inclined surface and particles at the upper end of the bed will sluff off and roll down over the top surface of the material into the trough.

With respect to the support 86, the arrangement of the gas jets and the openings in the inclined extending portion 92 also compensates for expansion and contraction or the like during operation of the unit and as well for vibration between the different members without adversely effecting the apparatus.

While only a single embodiment of apparatus has been shown in the drawings and described in detail, other apparatus and embodiments can be utilized providing that the material being treated is imparted such a movement as to effectively intermix it constantly or intermittently whereby substantially uniform treatment will be imparted to all constituent particles. This is particularly applicable to lime kilns having vibrating means for the lime being treated.

While the foregoing description has been with specific reference to a lime kiln of an entirely new nature for calcining lime of a particular nature, manifestly other types of material treatment can be effected in a device as taught by the present invention. The apparatus is equally adapted for use as a dryer, mixer and the like where similar types of materials and similar problems exist.

Manifestly minor changes in details of construction can be effected in the invention within the purview of those skilled in the art without departing from the spirit and scope thereof as defined in, and limited solely by, the appended claims.

We claim:

1. A limestone calcining kiln for particulate limestone comprising a material support including an upwardly inclined surface and a trough at the base thereof emerging into said surface and adapted to support a bed of particulate material with the top surface thereof at an angle to the horizontal not greater than the static angle of repose of material in said bed, means for introducing a combustible gaseous medium directly into the bed of material on said support for combustion therein including a plurality of perforations through said material support in proximity to the bottom thereof and means for introducing gas and air separately through said perforations and into the material on said bed, said means for introducing gas through said perforations comprising gas jets mounted in said perforations in spaced relation from the edge thereof, said jets terminating substantially in the plane of the interior surface of the support, the area of the perforations surrounding said jets constituting air passageways, means for vibrating said support in a straight-line motion in a direction at an angle of inclination to the horizontal and at a frequency operable to impel the material upwardly away from said support and along said inclined surface, said inclined surface having an angle of inclination to the horizontal operable to cause, upon movement of said support, material in the bottom of the bed to climb up the inclined surface and particles of the material at the upper end of the bed to roll down over the top surface of the bed into said trough wherein they transmit upward motion of the trough to the material for movement upwardly along said inclined surface, and the particles in said bed of material are intermixed.

2. A device as claimed in claim 1, wherein said support has a plurality of said spaced perforations in said inclined surface and said trough.

3. A device as claimed in claim 2, a casing, a plurality of material supports mounted in said casing in vertically spaced relationship, said casing being inclined at an angle to the horizontal in a direction substantially in a plane tangential to the upper ends of said inclined surfaces of said supports.

4. A device as claimed in claim 3, a support for said casing, means movably mounting said casing on said support including resilient means interconnecting said reciprocating means and said casing, said resilient means being spring means having predetermined natural frequencies of vibration.

5. A device as claimed in claim 4, and further including means defining material passages interconnecting the bottoms of each said material support and the tops of the next succeeding lower material support, means for introducing material to be treated into the upper one of said material supports and discharge means for material from the lowermost one of said supports.

6. A device as claimed in claim 5, said gaseous medium being introduced solely into the bed of material on the lowermost one of said material supports, said supports above said lowermost one of said supports comprising pretreating zones for the material therein.

References Cited in the file of this patent

UNITED STATES PATENTS

| | | |
|---|---|---|
| 2,503,788 | White | Apr. 11, 1950 |
| 2,684,840 | Behme et al. | July 27, 1954 |
| 2,702,436 | Perkins | Feb. 22, 1955 |
| 2,840,923 | Behrens | July 1, 1958 |

FOREIGN PATENTS

| | | |
|---|---|---|
| 494,899 | Germany | Mar. 29, 1930 |
| 458,071 | Great Britain | Dec. 14, 1936 |
| 744,603 | Great Britain | Feb. 8, 1956 |